W. H. TAYLOR.
Apparatus for Slotting Metal.

No. 233,953.        Patented Nov. 2, 1880.

WITNESSES
C. Clarence Poole
Wm A Skinkle

INVENTOR
Warren H Taylor
By his Attorneys
Baldwin, Hopkins & Peyton

UNITED STATES PATENT OFFICE.

WARREN H. TAYLOR, OF STAMFORD, CONNECTICUT, ASSIGNOR TO THE YALE LOCK MANUFACTURING COMPANY, OF SAME PLACE.

APPARATUS FOR SLOTTING METAL.

SPECIFICATION forming part of Letters Patent No. 233,953, dated November 2, 1880.

Application filed April 9, 1878.

*To all whom it may concern:*

Be it known that I, WARREN H. TAYLOR, of Stamford, in the county of Fairfield and State of Connecticut, have invented an Improved Apparatus for Slotting Metal, of which the following is a specification.

The principle of my invention is simply that of cutting or sawing into work in devious lines to form irregular or curved kerfs that shall be exactly alike. The particular purpose I have in view is to form sinuous key-slots in the hubs or cylinders of locks which are adapted for the use of sheet-metal keys with side bits or serrations, like the ordinary "Security" Yale-lock key.

There are many practical considerations in favor of having the key-blade of such a key grooved or corrugated longitudinally, and there is little difficulty in properly corrugating such a key-blade in the process of manufacture by the use of suitable dies, but the formation of a corresponding keyway in the lock-hub or cylinder has heretofore been attended with considerable difficulty; and it is the object of my invention to render it easy and economical to form such keyways that shall be uniform for particular patterns of hubs or cylinders, and that shall neatly fit the respective standard keys. Accordingly I have devised the simple apparatus hereinafter described and claimed, which consists merely of a suitable carriage, on which the work is secured, and by which it is advanced deviously against the saw to be sinuously slotted with uniformity and exactness.

Figure 1:
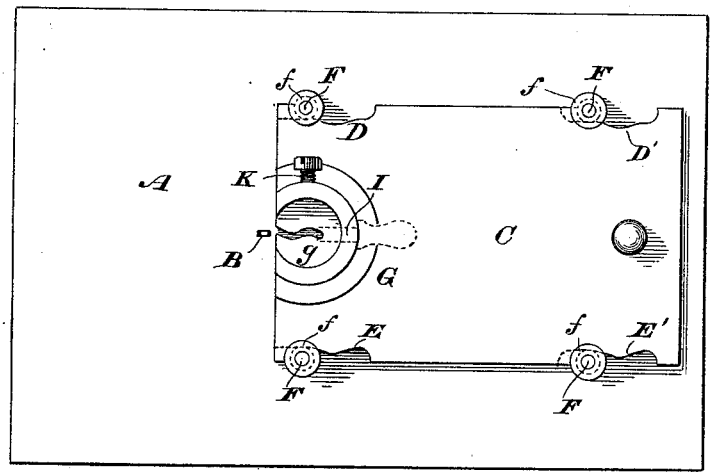
Figure 2:
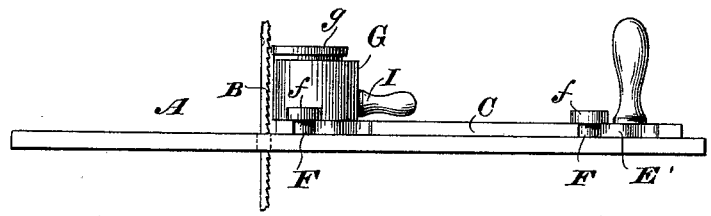
Figure 3:

In the accompanying drawings, Figure 1 is a plan view of my apparatus. Fig. 2 is a side view, and Fig. 3 is a section of the saw-blade.

A indicates a bench or table, through which the saw-blade B works, and on which is secured the carriage C.

The saw may be either a gig or band saw of the ordinary kind for fine work, and may be operated in the usual manner.

The carriage consists of a reciprocating plate or platform provided on each side with two correspondingly-shaped curvilinear cam or former surfaces, D D′ and E E′, of a contour adapted to give the carriage the desired lateral reciprocating motion during its longitudinal reciprocating movement.

F F F F indicate studs fixed in the table and provided with friction-rollers *f f f f*, which bear against the cam-surfaces of the plate as it moves forward and back, and give to it the sinuous course corresponding to the particular configuration of the curvilinear cam-surfaces, which, of course, may be varied at will in their formation. On the front of the plate is a slot or opening immediately under the work to be slotted, making an open way for the saw as the plate and work are advanced and withdrawn.

G indicates a work-holder, consisting of a cup with a dowel-pin, I, serving to gage a key-hub, *g*, to be slotted, and provided with a set-screw, K, to secure the hub firmly during the operation. These are shown merely for illustration, and any other work-holder may be employed or any other work may be operated upon.

A portion of the plate in front of each cam or former surface may be cut away, as indicated in dotted lines, to permit the plate and work to be withdrawn a convenient distance from the saw for handling.

The plate may be operated by hand or by gearing of any suitable kind, substantially such, for instance, as reciprocates a small metal planer-bed.

What I claim as new and of my invention is—

The combination, with the guide-studs, of the plate having the four cams and saw-slot.

In testimony whereof I have hereunto subscribed my name.

WARREN H. TAYLOR.

Witnesses:
E. D. OGDEN, Jr.,
SCHUYLER MERRITT.